(12) United States Patent
Bell et al.

(10) Patent No.: US 8,302,489 B2
(45) Date of Patent: Nov. 6, 2012

(54) FLOW METER SYSTEM AND METHOD FOR MEASURING FLOW CHARACTERISTICS OF A THREE PHASE FLOW

(75) Inventors: Mark James Bell, Longmont, CO (US); Craig B McAnally, Thornton, CO (US); Richard L St. Pierre, Jr., North Andover, MA (US); Andrew Timothy Patten, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 488 days.

(21) Appl. No.: 12/668,704

(22) PCT Filed: Jul. 30, 2007

(86) PCT No.: PCT/US2007/074711
§ 371 (c)(1),
(2), (4) Date: Jan. 12, 2010

(87) PCT Pub. No.: WO2009/017494
PCT Pub. Date: Feb. 5, 2009

(65) Prior Publication Data
US 2010/0198531 A1  Aug. 5, 2010

(51) Int. Cl.
*G01F 1/74* (2006.01)
*G01F 1/84* (2006.01)
(52) U.S. Cl. .................. 73/861.04; 73/861.355
(58) Field of Classification Search ............. 73/861.356, 73/861.355, 861.357, 861.04
See application file for complete search history.

(56) References Cited

U.S. PATENT DOCUMENTS

| | | | |
|---|---|---|---|
| 5,497,666 A * | 3/1996 | Patten et al. | 73/861.355 |
| 5,661,232 A | 8/1997 | Van Cleve et al. | |
| 6,763,730 B1 | 7/2004 | Wray | |
| 7,802,484 B2 * | 9/2010 | Pankratz et al. | 73/861.355 |
| 2005/0061060 A1 | 3/2005 | Gysling et al. | |
| 2010/0083769 A1 * | 4/2010 | Pankratz et al. | 73/861.355 |

FOREIGN PATENT DOCUMENTS

| | | |
|---|---|---|
| CN | 1217788 A | 5/1999 |
| CN | 1853088 A | 10/2006 |
| JP | 10281846 | 10/1998 |
| WO | 0131298 A2 | 5/2001 |
| WO | 2005010470 | 2/2005 |
| WO | WO-2006/127527 A1 | 11/2006 |
| WO | 2007022118 A1 | 2/2007 |
| WO | 2007074055 A1 | 7/2007 |

* cited by examiner

Primary Examiner — Jewel V Thompson
(74) Attorney, Agent, or Firm — The Ollila Law Group LLC (57) ABSTRACT

A vibratory flow meter (5) for measuring flow characteristics of a three phase flow is provided according to the invention. The vibratory flow meter (5) includes a meter assembly (10) including pickoff sensors (105, 105') and meter electronics (20) coupled to the pickoff sensors (105, 105'). The meter electronics (20) is configured to receive a vibrational response from the pickoff sensors (105, 105), generate a first density measurement of the three phase flow using a first frequency component of the vibrational response, and generate at least a second density measurement of the three phase flow using at least a second frequency component of the vibrational response. The at least second frequency component is a different frequency than the first frequency component. The meter electronics (20) is further configured to determine one or more flow characteristics from the first density measurement and the at least second density measurement.

39 Claims, 8 Drawing Sheets

FLOW METER SYSTEM AND METHOD FOR MEASURING FLOW CHARACTERISTICS OF A THREE PHASE FLOW

BACKGROUND OF THE INVENTION

1. Field of the Invention

The present invention relates to a flow meter system and method, and more particularly, to a flow meter system and method for measuring flow characteristics of a three phase flow.

2. Statement of the Problem

Flow meters are used to measure the mass flow rate, density, and other characteristics of flowing materials. The flowing materials can comprise liquids, gases, combined liquids and gases, solids suspended in liquids, liquids including gases and suspended solids, etc.

Vibrating conduit sensors, such as Coriolis mass flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Density of the flow material can be determined from a frequency of a vibrational response of the flow meter. Two such transducers (or pickoff sensors) are typically employed in order to measure a vibrational response of the flow conduit or conduits and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive flow measurements.

Using recent advances in signal processing and meter design and taking note of fluid dynamics including mixing, bubble size, etc., a low frequency vibratory flow meter can be used to accurately measure the mixture density and mixture mass flow of a multiphase fluid stream. Although this is a big advancement, many flow meter users want to know the liquid-only density. The main application for a liquid-only density is in upstream oil and gas metering, for both three phase oilfield flow measurement and for liquid-only cement process measurement. A vibratory flow meter capable of measuring a liquid-only density would eliminate the need for a gas volume fraction meter to measure the gas volume fraction of a multiphase flow. This would eliminate additional cost and complexity.

In the upstream oil and gas industry, oil wells typically produce water, oil, and natural gas. A separator is used to separate these components into a gas leg and a liquid leg. The density of the liquid leg is then measured and used to compute the fraction of oil and the fraction of water that make up the liquid stream. This measurement is simply a concentration measurement based on the measured density and is termed net oil computing. For example, if oil has a density of 0.8 g/cc and water has a density of 1.0 g/cc, a measured mixture density of 0.9 implies 50% water and 50% oil by volume. Similarly, a measured density of 0.95 implies 75% water and 25% oil by volume.

Where only two liquid phases are present and where the base densities of oil and water are known, the two phase component determination is relatively easy, with two equations and two unknowns. The basic equations comprise:

$$\Phi_{oil} + \Phi_{water} = 1$$

$$\rho_{oil}\Phi_{oil} + \rho_{water}\Phi_{water} = \rho_{mix}$$

Where the ($\Phi$) term comprises a volumetric phase fraction and the ($\rho$) term comprises density. This can be written in matrix form as:

$$\begin{bmatrix} 1 & 1 \\ \rho_{oil} & \rho_{water} \end{bmatrix} \begin{Bmatrix} \Phi_{oil} \\ \Phi_{water} \end{Bmatrix} = \begin{Bmatrix} 1 \\ \rho_{mix} \end{Bmatrix}$$

Inputting the water and oil density and measuring the mixture density with a vibratory flow meter, the standard net oil computing process calculates the volumetric phase fractions with a matrix inverse, comprising:

$$\begin{Bmatrix} \Phi_{oil} \\ \Phi_{water} \end{Bmatrix} = \begin{bmatrix} 1 & 1 \\ \rho_{oil} & \rho_{water} \end{bmatrix}^{-1} \begin{Bmatrix} 1 \\ \rho_{mix} \end{Bmatrix}$$

Once the two phase fractions are known, they can be multiplied by a volume flow rate to determine the volume of water and the volume of oil that are being produced. In addition, the component mass flow rate can be calculated by multiplying the component volume flow rate by the component density.

In some cases, the liquid stream will still carry some gas, despite a separation process. This will occur when a pressure drop is present across a valve or flow measurement device. As a result, some entrained gas breaks out of the oil mixture. Gas break out will also occur when the separator is not working perfectly due to increased oil viscosity, stimulated production, or slugging through the well. In these cases, the gas present in the liquid stream results in very large errors in the actual water and oil production. For example, if a well is producing only water and natural gas and the output of the liquid leg of the separator includes 95% water and 5% gas, the indicated mixture density is 0.95 g/cc (assuming the gas density is zero) and the net oil computation assumes that the liquid stream is again 75% water and 25% oil. In reality, this well is producing no oil and the error in oil production is infinite.

A typical solution is the addition of a gas void fraction (GVF) meter. The gas fraction can be quantified by the GVF meter and the gas portion of the liquid density measurement can be removed. This eliminates large entrained gas errors in the net oil computing calculation.

When three phases are present there are three unknowns (phase fraction of oil, water, and natural gas) and another equation is required to solve the problem. As described above, in the past this third equation has come from a water-cut probe or gas void fraction meter. However, it is desired to make this measurement with a single Coriolis meter.

There remains a need in the art for a vibratory flow meter and method that can measure flow characteristics of a three phase flow.

SUMMARY OF THE SOLUTION

A vibratory flow meter for measuring flow characteristics of a three phase flow is provided according to an embodiment of the invention. The vibratory flow meter comprises a meter assembly including pickoff sensors and meter electronics coupled to the pickoff sensors. The meter electronics is configured to receive a vibrational response from the pickoff sensors, generate a first density measurement of the three phase flow using a first frequency component of the vibrational response, and generate at least a second density measurement of the three phase flow using at least a second frequency component of the vibrational response. The at least second frequency component comprises a different frequency than the first frequency component. The meter electronics is further configured to determine one or more flow characteristics from the first density measurement and the at least second density measurement.

A vibratory flow meter system for measuring flow characteristics of a three phase flow is provided according to an embodiment of the invention. The vibratory flow meter system comprises a first vibratory flow meter, at least a second vibratory flow meter, and a processing system coupled to the first vibratory flow meter and to the at least second vibratory flow meter. The processing system is configured to receive a first vibrational response from the first vibratory flow meter and receive at least a second vibrational response from the at least second vibratory flow meter. The at least second vibrational response comprises a different frequency than the first vibrational response. The processing system is further configured to generate a first density measurement of the three phase flow from the first vibrational response of the first vibratory flow meter and generate an at least second density measurement of the three phase flow from the at least second vibrational frequency response of the at least second vibratory flow meter. The processing system is further configured to determine one or more flow characteristics from the first density measurement and the at least second density measurement.

A method for measuring flow characteristics of a three phase flow is provided according to the invention. The method comprises receiving a vibrational response from a vibratory flow meter, generating a first density measurement of the three phase flow using a first frequency component of the vibrational response, and generating at least a second density measurement of the three phase flow using at least a second frequency component of the vibrational response. The at least second frequency component comprises a different frequency than the first frequency component. The method further comprises determining one or more flow characteristics from the first density measurement and the at least second density measurement.

A method for measuring flow characteristics of a three phase flow is provided according to the invention. The method comprises receiving a first vibrational response and an at least second vibrational response, generating a first density measurement of the three phase flow from the first vibrational response, and generating an at least second density measurement of the three phase flow from the at least second vibrational frequency response. The at least second vibrational frequency response comprises a different frequency than the first vibrational frequency response. The method further comprises determining one or more flow characteristics from the first density measurement and the at least second density measurement.

ASPECTS OF THE INVENTION

In one aspect of the vibratory flow meter, the meter electronics is further configured to receive predetermined component densities for each of the three components of the three phase flow.

In another aspect of the vibratory flow meter, the meter electronics is further configured to receive predetermined speed of sound values for each of the three components of the three phase flow.

In yet another aspect of the vibratory flow meter, determining the one or more flow characteristics further comprises determining phase fractions for each of the three components of the three phase flow.

In yet another aspect of the vibratory flow meter, determining the one or more flow characteristics further comprises determining a gas void fraction (GVF) of the three phase flow.

In yet another aspect of the vibratory flow meter, determining the one or more flow characteristics further comprises determining a water cut of the three phase flow.

In yet another aspect of the vibratory flow meter, the at least second frequency component is substantially superimposed on the first frequency component.

In yet another aspect of the vibratory flow meter, the first frequency component and the at least second frequency component occur at substantially alternate times in the vibrational response.

In yet another aspect of the vibratory flow meter, the meter electronics is further configured to vibrate the meter assembly at a first frequency and vibrate the meter assembly at an at least second frequency, with the at least second frequency being a different frequency than the first frequency, receive the vibrational response from the pickoff sensors, and separate the vibrational response into the first frequency component and the at least second frequency component.

In yet another aspect of the vibratory flow meter, the meter electronics is further configured to vibrate the meter assembly at a first frequency, receive the vibrational response from the pickoff sensors, and separate the vibrational response into the first frequency component and the at least second frequency component, wherein the first frequency component and the at least second frequency component are generated by the vibration at the first frequency.

In yet another aspect of the vibratory flow meter, receiving the vibrational response further comprises separating the vibrational response into the first frequency component and the at least second frequency component.

In yet another aspect of the vibratory flow meter, receiving the vibrational response further comprises filtering the vibrational response into the first frequency component and the at least second frequency component.

In one aspect of the vibratory flow meter system, the processing system is further configured to receive predetermined component densities for each of the three components of the three phase flow.

In another aspect of the vibratory flow meter system, the processing system is further configured to receive predetermined speed of sound values for each of the three components of the three phase flow.

In yet another aspect of the vibratory flow meter system, determining the one or more flow characteristics further comprises determining phase fractions for each of the three components of the three phase flow.

In yet another aspect of the vibratory flow meter system, determining the one or more flow characteristics further comprises determining a gas void fraction (GVF) of the three phase flow.

In yet another aspect of the vibratory flow meter system, determining the one or more flow characteristics further comprises determining a water cut of the three phase flow.

In yet another aspect of the vibratory flow meter system, the first vibratory flow meter is vibrated at a first frequency to generate the first vibrational response and the at least a second vibratory flow meter is vibrated at an at least second frequency to generate the at least second vibrational response.

In one aspect of the method, the method further comprises the preliminary step of receiving predetermined component densities for each of the three components of the three phase flow.

In another aspect of the method, the method further comprises the preliminary step of receiving predetermined speed of sound values for each of the three components of the three phase flow.

In yet another aspect of the method, determining the one or more flow characteristics further comprises determining phase fractions for each of the three components of the three phase flow.

In yet another aspect of the method, determining the one or more flow characteristics further comprises determining a gas void fraction (GVF) of the three phase flow.

In yet another aspect of the method, determining the one or more flow characteristics further comprises determining a water cut of the three phase flow.

In yet another aspect of the method, the at least second frequency component is substantially superimposed on the first frequency component.

In yet another aspect of the method, the first frequency component and the at least second frequency component occur at substantially alternate times in the vibrational response.

In yet another aspect of the method, receiving the vibrational response further comprises vibrating a meter assembly of the vibratory flow meter at a first frequency and further vibrating the meter assembly at an at least second frequency, with the at least second frequency being a different frequency than the first frequency, receiving the vibrational response from pickoff sensors of the meter assembly, and separating the vibrational response into the first frequency component and the at least second frequency component.

In yet another aspect of the method, receiving the vibrational response further comprises vibrating a meter assembly of the vibratory flow meter at a first frequency, receiving the vibrational response from pickoff sensors of the meter assembly, and separating the vibrational response into the first frequency component and the at least second frequency component, wherein the first frequency component and the at least second frequency component are generated by the vibration at the first frequency.

In yet another aspect of the method, receiving the vibrational response further comprises separating the vibrational response into the first frequency component and the at least second frequency component.

In yet another aspect of the method, receiving the vibrational response further comprises filtering the vibrational response into the first frequency component and the at least second frequency component.

In yet another aspect of the method, receiving the vibrational response further comprises receiving the first vibrational response from a first vibratory flow meter and receiving the at least second vibrational response from a second vibratory flow meter, with the at least second vibrational response being a different frequency than the first vibrational response.

In yet another aspect of the method, receiving the vibrational response further comprises vibrating a first vibratory flow meter at a first frequency to generate the first vibrational response and vibrating at least a second vibratory flow meter at an at least second frequency to generate the at least second vibrational response, with the at least second vibrational response being a different frequency than the first vibrational response.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
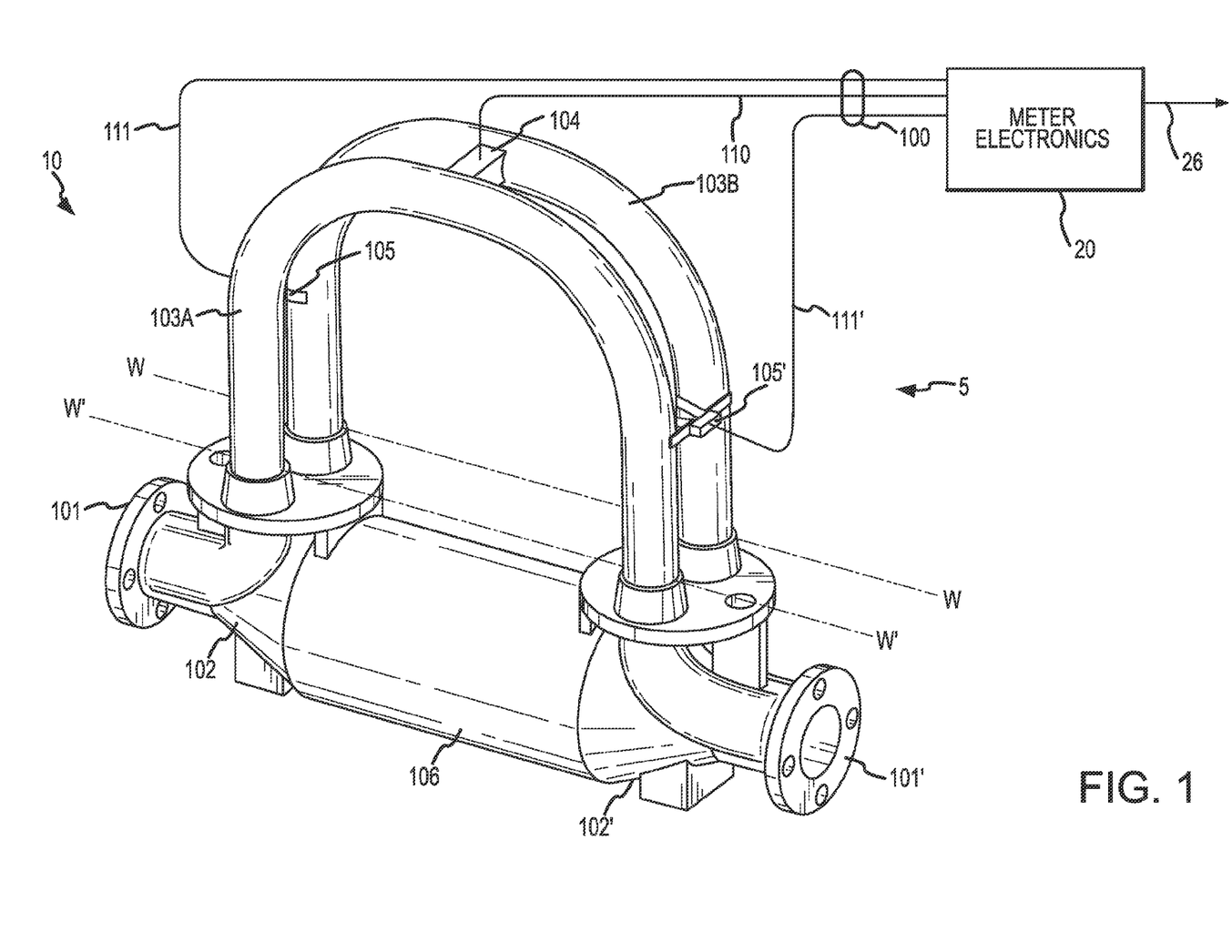
FIG. 1 shows a flow meter comprising a flow meter assembly and meter electronics.

FIG. 1 shows a flow meter 5 comprising a flow meter assembly 10 and meter electronics 20. The meter electronics 20 is connected to the meter assembly 10 via leads 100 and is configured to provide measurements of one or more of a density, mass flow rate, volume flow rate, totalized mass flow, temperature, and other information over a communication path 26. It should be apparent to those skilled in the art that the present invention can be used in any type of Coriolis flow meter regardless of the number of drivers, pick-off sensors, flow conduits, or the operating mode of vibration. In addition, it should be recognized that the flow meter 5 can alternatively comprise a vibratory densitometer.

The flow meter assembly 10 includes a pair of flanges 101 and 101', manifolds 102 and 102', a driver 104, pick-off sensors 105-105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106. The spacer 106 maintains the spacing between the manifolds 102 and 102' in order to prevent undesired vibrations in the flow conduits 103A and 103B. When the flow meter assembly 10 is inserted into a conduit system (not shown) which carries the flow material being measured, the flow material enters the flow meter assembly 10 through the flange 101, passes through the inlet manifold 102 where the total amount of flow material is directed to enter the flow conduits 103A and 103B, flows through the flow conduits 103A and 103B and back into the outlet manifold 102', where it exits the meter assembly 10 through the flange 101'.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the flow meter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110.

The meter electronics 20 can generate a drive signal at a predetermined frequency. The meter electronics can generate a drive signal at varying frequencies, including generating multiple superimposed frequencies.

The meter electronics 20 receives sensor signals on the leads 111 and 111', respectively. The meter electronics 20 produces a drive signal on the lead 110 which causes the driver 104 to oscillate the flow conduits 103A and 103B. The meter electronics 20 processes the left and right velocity signals from the pick-off sensors 105 and 105' in order to compute a mass flow rate. The communication path 26 provides an input and an output means that allows the meter electronics 20 to interface with an operator or with other electronic systems. The description of FIG. 1 is provided merely as an example of the operation of a Coriolis flow meter and is not intended to limit the teaching of the present invention.

Advantageously, available low frequency vibratory flow meters can accurately measure density of a three phase flow where the amount of entrained air is not excessive. Conversely, high frequency meters are available that accurately measure a frequency of vibration of the meter but are encumbered by additional errors in the presence of multiphase flows. These two characteristics are advantageously employed to accurately and reliably determined densities and flow characteristics.

Figure 2:
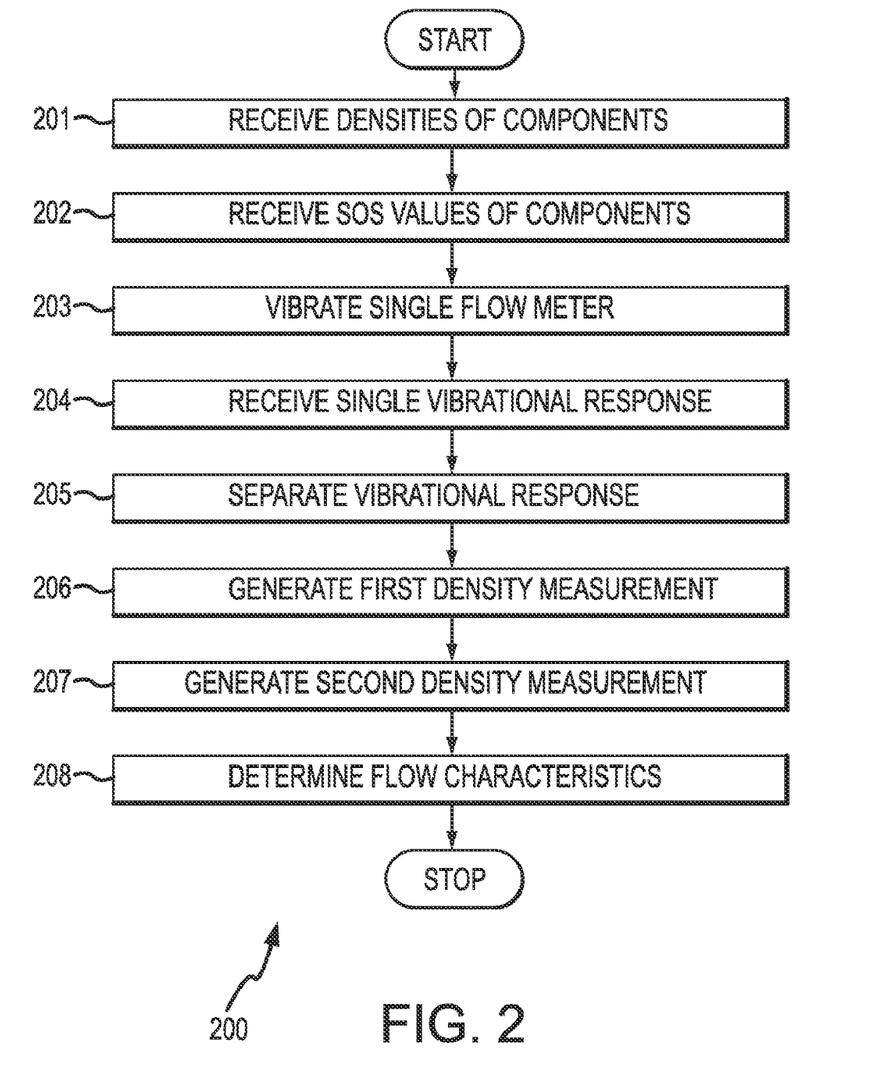
FIG. 2 is a flowchart of a method for measuring flow characteristics of a three phase flow according to an embodiment of the invention.

FIG. 2 is a flowchart 200 of a method for measuring flow characteristics of a three phase flow according to an embodiment of the invention. In step 201, densities are received for each of the three phase components. The densities comprise known or assumed values. The densities can be received from a remote device or from an operator, for example. The densities can be stored or programmed into an appropriate storage.

In step 202, speed of sound values are received for each of the three phase components. The speed of sound values comprise known or assumed values. The speed of sound values can be received from a remote device or from an operator, for example. The speed of sound values can be stored or programmed into an appropriate storage.

In step 203, a flow meter assembly of a vibratory flow meter is vibrated. Only a single vibratory flow meter is required according to this embodiment of the invention. The flow meter assembly can be vibrated at one or more frequencies.

In one embodiment the flow meter assembly is vibrated at a single drive frequency. The single drive frequency can generate the vibrational response including the first frequency component and an at least second frequency component, as the vibration of the meter assembly at the single drive frequency can induce multiple frequency response components. For example, noise created by flow through the flow meter will create vibration in the flow meter assembly at an at least second frequency. This at least second frequency component will typically be a different frequency than the drive frequency. This at least second frequency component of the vibrational response will of course be much smaller in amplitude than the first frequency component. However, this at least second frequency component can be amplified and otherwise processed. The first vibrational frequency response and the at least second vibrational frequency response can subsequently be processed in the steps below.

In another embodiment, the flow meter assembly of the single flow meter is vibrated at a first drive frequency and is also vibrated at an at least second drive frequency. The at least second drive frequency is a different frequency than the first drive frequency. For example, the first drive frequency can be about 100 Hertz (Hz) and the second drive frequency can be about 450 Hz. It should be understood that these drive frequencies are given for illustration only and the invention is not limited to any particular drive frequencies. It should be understood that the single vibratory flow meter may need to be calibrated for both the first drive frequency and the at least second drive frequency. The single vibratory flow meter may be calibrated using both air and water, for example.

In one embodiment, the flow meter assembly is vibrated at the first drive frequency and then at the at least second drive frequency (i.e., the vibrations occur alternately in time). Alternatively, the flow meter can be simultaneously vibrated at both the first drive frequency and the at least second drive frequency (a drive signal can therefore comprise a composite of two or more drive frequencies). As a result, a vibrational response of the flow meter includes at least two component frequencies.

In all of the above embodiments, the single vibratory flow meter produces both a first vibrational frequency response and at least a second vibrational frequency response. The first vibrational frequency response and the second vibrational frequency response can subsequently be processed in the steps below.

In step 204, the vibrational response is received from the single vibratory flow meter. The vibrational response can include the first frequency component and the at least second frequency component. The at least second frequency component is a different frequency than the first frequency component. For example, the at least second frequency component can comprise a higher frequency than the first frequency component.

In step 205, the vibrational response is processed to obtain the first frequency component and the at least second frequency component. The processing can comprise separating the vibrational response into the first frequency component and the at least second frequency component. The processing can comprise filtering the vibrational response into the first frequency component and the at least second frequency component, such as through use of bandpass filters, for example.

In step 206, a first density measurement of the three phase flow is generated. The first density measurement is generated using a first frequency derived from the first frequency component.

In step 207, at least a second density measurement of the three phase flow is generated. The at least second density measurement is generated using an at least second frequency of the at least second frequency component. As previously discussed, the at least second frequency is a different frequency than the first frequency. Consequently, due to vibration of the three phase flow material at different frequencies, and the resulting compressibility effects (see discussion below), the first density measurement and the at least second density measurement will differ. The difference can be used to determine other flow characteristics.

In step 208, one or more flow characteristics are determined from a difference between the first and second density measurements (see discussion below). The first and second density measurements can be used to determine a gas fraction and first and second liquid fractions of the three phase flow. For example, for a three phase flow comprising oilfield production, the first and second density measurements can be used to determine a gas void fraction (GVF) and a water cut of the three phase flow.

Once the three phase fractions are known, they can be multiplied by a volume flow rate to determine the volume of water and the volume of oil that are being produced, for example. In addition, the component mass flow rate can be calculated by multiplying the component volume flow rate by the component density.

The effects of gas compressibility and fluid compressibility in Coriolis meters and vibrating tube densitometers have been investigated. Compressibility can lead to significant errors in flow measurements due to the effects on the measured density of the flow material. The compressibility effects can be caused by the vibration of the flow meter, wherein aggressive vibration can cause compression of both the liquid and the gas phases in the multi-phase flow. However, compressibility of the mixture is the major effect.

This compressibility effect is contrary to some of the assumptions that have been made in the derivation of equations for mass flow and density measurements. It is known that meters with a low drive frequency generally do not exhibit these phenomena, as a lower frequency flow meter by design will place lower forces on the flow material. As a result, low frequency vibratory flow meters exert smaller compressibility forces on a three phase flow. In contrast, higher frequency flow meters will place higher forces on the flow material and consequently will exert more compression on all phase components of a three phase flow. The compressibility effect creates both mass flow and density errors in a vibratory flow meter. It may be useful to generate vibrational responses both with and without measurable compressibility effects. A quantification of the compressibility effects on the three phase flow can be used to determine densities and phase fractions of the flow, among other things.

If the speeds of sound for the gas and the two liquid phases are known, and if a density measurement is obtained from both a low frequency meter and a high frequency meter, an additional equation can be generated to solve the three phase flow problem. Uniquely, the flow meter can be driven in two modes; in a low frequency mode (such as a standard drive mode, for example) and in a high frequency mode. The error generated by differencing these two density measurements can be used as the missing third equation.

A solution to the three phase flow problem is non-trivial. A third equation is required to resolve a flow measurement into three components. The two known equations are shown below:

$$\Phi_{oil}+\Phi_{water}+\Phi_{gas}=1 \tag{1}$$

$$\rho_{oil}\Phi_{oil}+\rho_{water}\Phi_{water}+\rho_{gas}\Phi_{gas}=\rho_{mix} \tag{2}$$

Where the ($\Phi$) term comprises a volumetric phase fraction and the ($\rho$) term comprises density. In these two equations, the overall (i.e., three phase) mixture density ($\rho_{mix}$) can be accurately measured by a vibratory flow meter or vibratory flow meter system. In addition, the densities of each component ($\rho_{oil}$, $\rho_{water}$, $\rho_{gas}$) can be assumed. For example, they can be inputted by a user or can be programmed into and stored by the meter electronics 20 or the processing system 707 (see FIG. 7) or other equivalent component. It should be noted that the gas density ($\rho_{gas}$) is a strong function of pressure. Consequently, there are two equations and three unknowns ($\Phi_{oil}$, $\Phi_{water}$, and $\Phi_{gas}$ (i.e., each volumetric phase fraction). Another equation is required in order to be able to solve for the component densities $\rho_{oil}$, $\rho_{water}$, and $\rho_{gas}$.

The source of the third equation was found by looking into the density performance of high frequency meters operating in the presence of entrained air. It was found that high frequency flow meters generate unexpectedly high density values when air is injected into the flow stream. This is counter-intuitive, as adding air to a fluid makes the fluid lighter and less dense. However, this unexpected result is completely explained by the speed of sound model and the effects of compressibility, wherein entrained air lowers the speed of sound of the three phase flow and increases the compressibility effects. The high density readings experienced by high frequency flow meters for increasing void fraction result from a sloshing effect during vibration, wherein gas bubbles don't move completely with the flow fluid.

In contrast, it is well known that low frequency meters, such as flow meters operating at less than 200 Hz, produced very good density estimates. This is also according to the speed of sound theory, as a low frequency meter will exert minimal compressibility effects on a three phase flow. Slower vibrational speeds cause less compression and less sloshing.

Using the speed of sound theory, which has been validated on both low and high frequency meters, a prediction of density estimate for both low and high frequency modes can be made using a single vibratory flow meter. Alternatively, more than one flow meter can be used.

The derivation of the required third equation starts with the speed of sound equations. These equations define a mixture speed of sound ($a_{mix}$) for the three phase flow that is based on the individual component properties ($a_{gas}$, $a_{water}$, and $a_{oil}$).

$$\frac{1}{a_{mix}^2} = \rho_{mix}\left(\frac{\Phi_{oil}}{\rho_{oil}a_{oil}^2} + \frac{\Phi_{water}}{\rho_{water}a_{water}^2} + \frac{\Phi_{gas}}{\rho_{gas}a_{gas}^2}\right) \tag{3}$$

$$a_{mix} = \sqrt{\frac{1}{\rho_{mix}\left(\frac{\Phi_{oil}}{\rho_{oil}a_{oil}^2} + \frac{\Phi_{water}}{\rho_{water}a_{water}^2} + \frac{\Phi_{gas}}{\rho_{gas}a_{gas}^2}\right)}} \tag{4}$$

The mixture speed of sound ($a_{mix}$) can be used to determine the standing acoustic wave in a flow tube. The frequency (f) of an acoustic standing wave is well know and is related to the square root of stiffness (K) over mass (M). This relationship can then be manipulated to give an estimated fluid stiffness ($K_{fluid}$), which is not infinite due to the compressibility of the fluid.

$$\omega = 2\pi f = \left(\frac{3.86}{D}\right) a_{mix} = \sqrt{\frac{K_{fluid}}{M_{fluid}}} \quad (5)$$

$$K_{fluid} = M_{fluid}\left(\frac{3.86}{D}\right)^2 a_{mix}^2 = M_{fluid}(2\pi f)^2 \quad (6)$$

Where D is the inner diameter of the flow tube and (f) is the frequency of vibration. These results can then be inserted into an eigenvalue problem which defines the relationship between the high frequency drive mode, the mixture speed of sound ($a_{mix}$), the mixture density ($\rho_{mix}$), and the tube diameter (D).

$$\begin{bmatrix} M_{tube} & 0 \\ 0 & M_{fluid} \end{bmatrix} \begin{Bmatrix} \ddot{x}_1 \\ \ddot{x}_2 \end{Bmatrix} + \begin{bmatrix} K_{tube} + K_{fluid} & -K_{fluid} \\ -K_{fluid} & K_{fluid} \end{bmatrix} \begin{Bmatrix} x_1 \\ x_2 \end{Bmatrix} = \begin{Bmatrix} 0 \\ 0 \end{Bmatrix} \quad (7)$$

$$\det \begin{bmatrix} K_{tube} + K_{fluid} - \omega^2 M_{tube} & -K_{fluid} \\ -K_{fluid} & K_{fluid} - \omega^2 M_{fluid} \end{bmatrix} = 0 \quad (8)$$

Where ($\dot{x}$) is a flow tube displacement velocity and ($\ddot{x}$) is a flow tube acceleration factor. When the eigenvalue problem is solved, the frequency mode as a function of all of the parameters can be determined. The estimated density ($\rho$) of this mode is then defined by the density equation:

$$\rho = \frac{\rho_{water}}{\alpha}\left[\left(\frac{f_{vac}}{f}\right)^2 - 1\right] \quad (9)$$

$$\alpha = \left(\frac{f_{vac}}{f_{water}}\right)^2 - 1 = \frac{M_{tube}}{M_{water}} \quad (10)$$

Where ($\alpha$) is a density calibration constant. The solution of these equations results in the final third equation shown below:

$$\left(\frac{\Phi_{oil}}{\rho_{oil} a_{oil}^2}\right) + \left(\frac{\Phi_{water}}{\rho_{water} a_{water}^2}\right) + \left(\frac{\Phi_{gas}}{\rho_{gas} a_{gas}^2}\right) = f(\rho_i, \alpha, D, f_{vac}) \quad (11)$$

where:

$$f(\rho_i, \alpha, D, f_{vac}) = \frac{(1.84)^2 (\rho_{high} - \rho_{low})(\alpha \rho_{high} + \rho_{water})}{D^2 \pi^2 \rho_{high} \rho_{low} \rho_{water} f_{high\_vac}^2} \quad (12)$$

Where ($\rho_{high}$) and ($\rho_{low}$) are the measured densities at a high drive vibration/mode and at a low drive vibration/mode respectively, and ($\rho_{water}$) is a known water density value. This equation can be added to the other two to produce the following matrix equation:

$$\begin{bmatrix} 1 & 1 & 1 \\ \rho_{oil} & \rho_{water} & \rho_{gas} \\ \left(\frac{1}{\rho_{oil} a_{oil}^2}\right) & \left(\frac{1}{\rho_{water} a_{water}^2}\right) & \left(\frac{1}{\rho_{gas} a_{gas}^2}\right) \end{bmatrix} \begin{Bmatrix} \Phi_{oil} \\ \Phi_{water} \\ \Phi_{gas} \end{Bmatrix} = \begin{Bmatrix} 1 \\ \rho_{low} \\ f(\rho_i, \alpha, D, f_{vac}) \end{Bmatrix} \quad (13)$$

This matrix equation can then be inverted to the final form.

$$\begin{Bmatrix} \Phi_{oil} \\ \Phi_{water} \\ \Phi_{gas} \end{Bmatrix} = \begin{bmatrix} 1 & 1 & 1 \\ \rho_{oil} & \rho_{water} & \rho_{gas} \\ \left(\frac{1}{\rho_{oil} a_{oil}^2}\right) & \left(\frac{1}{\rho_{water} a_{water}^2}\right) & \left(\frac{1}{\rho_{gas} a_{gas}^2}\right) \end{bmatrix}^{-1} \begin{Bmatrix} 1 \\ \rho_{low} \\ f(\rho_i, \alpha, D, f_{vac}) \end{Bmatrix} \quad (14)$$

Equation (14) can be solved to determine the volume fractions $\Phi_{gas}$, $\Phi_{water}$, and $\Phi_{oil}$. In general, a user of the flow meter will want to know the water cut and the gas volume fraction for the three phase flow. The equations for these quantities, based on the known component fractions, are:

$$\text{Gas Volume Fraction} = GVF = \Phi_{gas} \quad (15)$$

$$\text{Water Cut} = WC = \frac{\Phi_{water}}{\Phi_{water} + \Phi_{oil}} = \frac{\Phi_{water}}{1 - \Phi_{gas}} = \frac{\Phi_{water}}{1 - GVF} \quad (16)$$

Using equations (15) and (16), the user can obtain an estimate of the gas void fraction. The vibratory flow meter (or flow meter system) therefore does not require a separate gas fraction meter. Using equations (15) and (16), the user can obtain an estimate of the water cut. The vibratory flow meter (or flow meter system) therefore does not require a separate water cut meter.

The determination of the phase component fractions can further be used to provide additional diagnostics. For example, an alarm can be generated if the GVF or WC values exceed predetermined thresholds.

Figure 3:
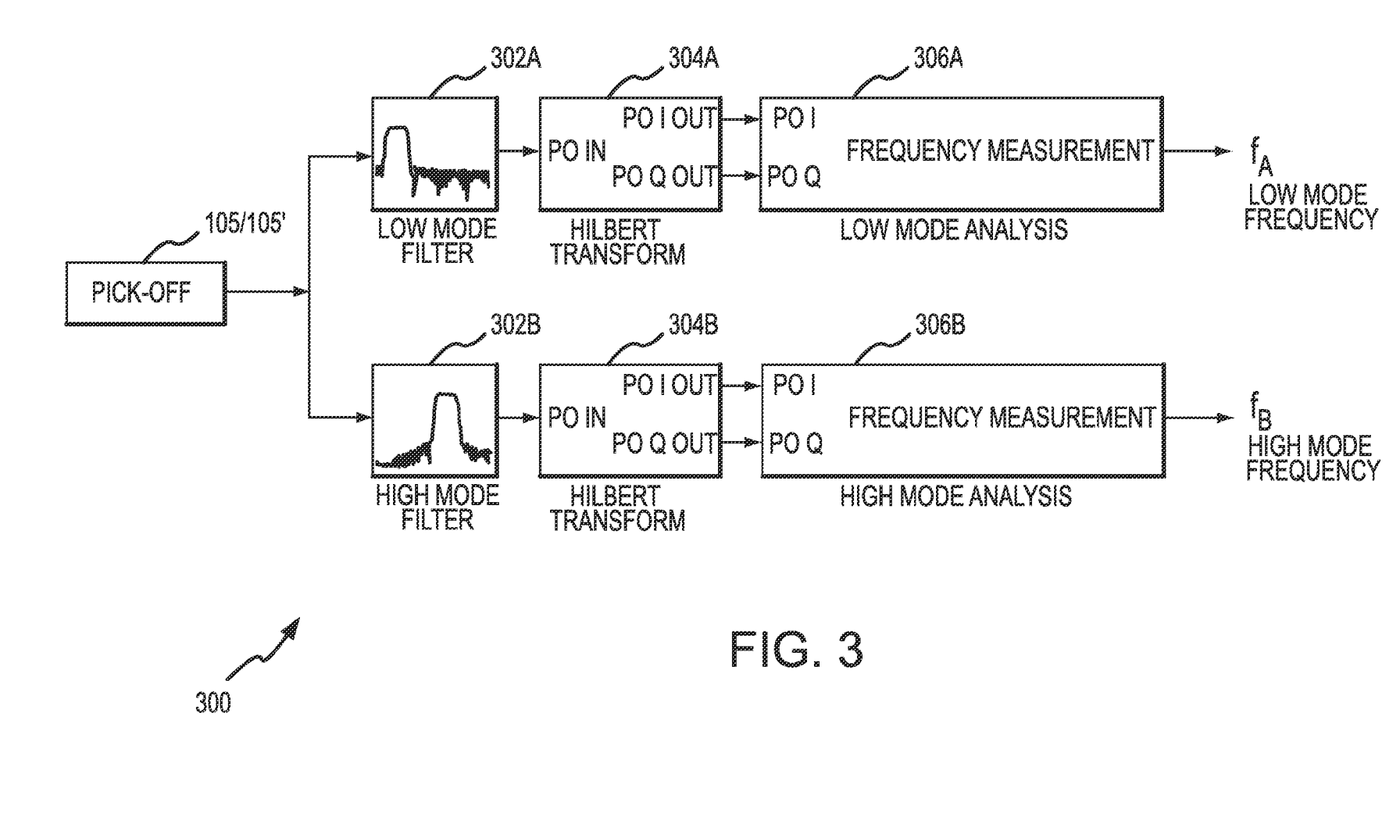
FIG. 3 shows circuitry for generating a first frequency and at least a second frequency according to an embodiment of the invention.

FIG. 3 shows circuitry 300 for generating a first frequency and at least a second frequency according to an embodiment of the invention. This embodiment is used with a single vibratory flow meter and therefore the circuitry 300 is coupled to a single pickoff 105/105' of the vibratory flow meter 5. The circuitry 300 can comprise a portion of the meter electronics 20. Alternatively, the circuitry 300 can comprise a portion of a processing system 707. The circuitry 300 includes filters 302A and 302B, Hilbert transforms 304A and 304B, and analysis blocks 306A and 306B.

The filter 302A filters out the first frequency component (i.e., a "low mode" in some embodiments) from the pickoff sensor 105/105' while the filter 302B filters out the at least second frequency component (i.e., a high frequency mode in some embodiments). The filters 302A and 302B therefore create two separate processing branches. More than two processing branches can be configured if desired, such as if more than two vibrational frequencies are employed.

In one embodiment, the filtering can comprise band-pass filtering centered around the expected fundamental frequency of the flow meter. The filtering can include filtering to remove noise and unwanted signals. In addition, other conditioning operations can be performed, such as amplification, buffering, etc. If the sensor signals comprise analog signals, this block can further comprise any manner of sampling, digitization, and decimation that are performed in order to produce digital sensor signals.

In some embodiments the mode filters 302A and 302B comprise digital Finite Impulse Response (FIR) polyphase decimation filters. The filters can be implemented in a processing device or processing routine of the meter electronics 20 or the processing system 707. These filters provide an optimal method for filtering and decimating the pickoff sensor signal, with the filtering and decimating being performed at the same chronological time and at the same decimation rate. Alternatively, the filters 302A and 302B can comprise Infinite Impulse Response (IIR) filters or other suitable digital filters or filter processes. However, it should be understood that other filtering processes and/or filtering embodiments are contemplated and are within the scope of the description and claims.

The Hilbert transform 304A phase shifts the first frequency component by about ninety degrees and the Hilbert transform 304B phases shifts the at least second frequency component by about ninety degrees. The phase shifting operation generates I and Q components (i.e., in-phase and quadrature components) of the respective frequency components. However, it should be understood that the 90 degree phase shift can be performed by any manner of phase shift mechanism or operation.

The I and Q components are received and processed by the analysis blocks 306A and 306B. The processing produces the first frequency $f_A$ and an at least second frequency $f_B$. The first frequency $f_A$ and the at least second frequency $f_B$ can be used to generate the first density and the at least second density.

The frequency according to the invention is advantageously computed from the 90 degree phase shift. The frequency in one embodiment uses the 90 degree phase shift and the corresponding sensor signal from which the 90 degree phase shift is derived (i.e., from the I and Q components).

The frequency thus derived is obtained without the need for any independent frequency reference signal. The frequency is obtained from the single 90 degree phase shift in an operation that is very fast. The resulting frequency has a high degree of accuracy.

Figure 4:
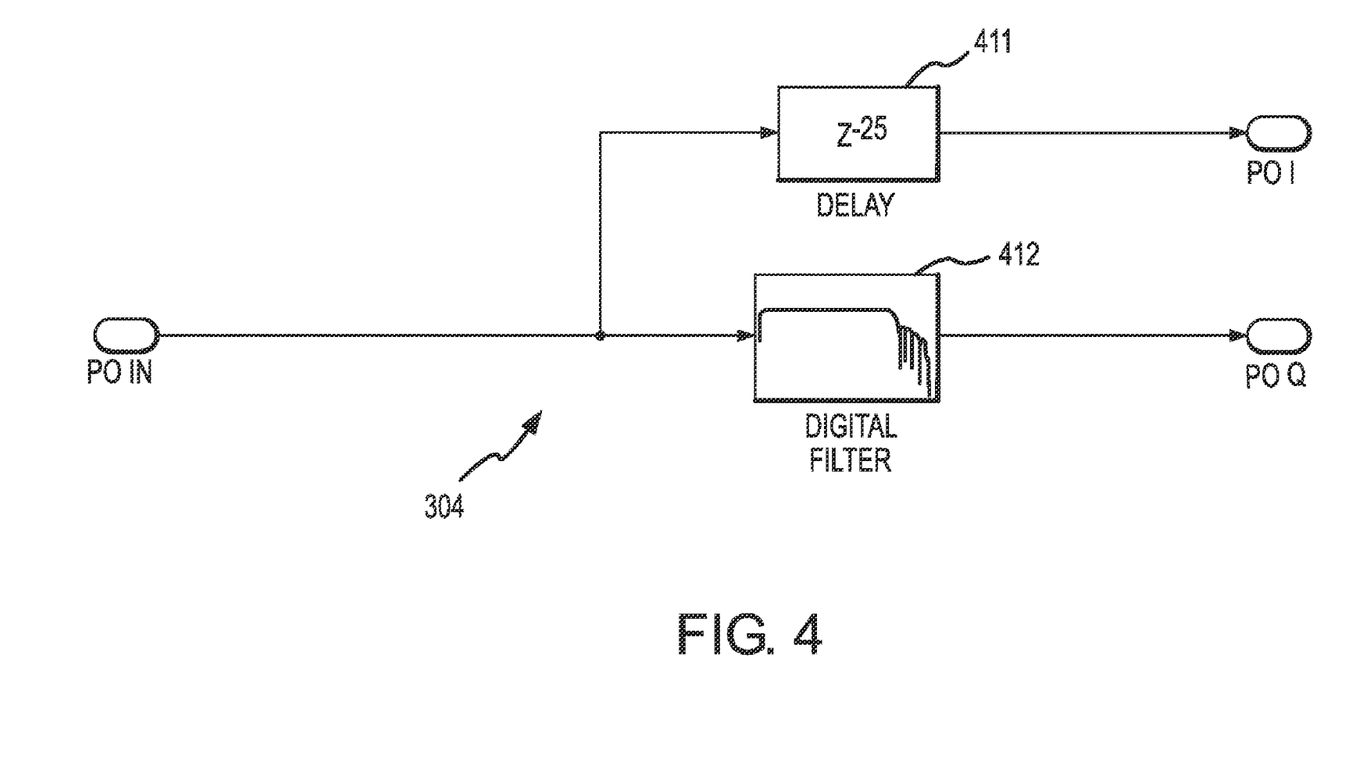
FIG. 4 shows detail of a portion of the Hilbert transform blocks according to an embodiment of the invention.

FIG. 4 shows detail of a portion of the Hilbert transform blocks 304A and 304B according to an embodiment of the invention. In the embodiment shown, the Hilbert transform blocks 304A and 304B each include a delay block 411 in parallel with a filter block 412. The delay block 411 introduces sampling delays. The delay block 411 therefore selects digital signal samples that are chronologically later in time than the digital signal samples that are filtered in parallel by the filter block 412. The filter block 412 performs a 90 degree phase shift on the inputted digital signal sample.

The Hilbert transform blocks 304A and 304B produce 90 degree phase-shifted versions of the pickoff (PO) signals, i.e., they produce a quadrature (Q) component of the original, in-phase (I) signal. The output of the Hilbert transform blocks 304A and 304B therefore provides the new quadrature (Q) components PO Q and PO Q for the first and at least second vibrational responses, along with the original, in-phase (I) signal components for the first and at least second vibrational responses.

The inputs to the Hilbert transform block 304A or 304B can be represented as:

$$PO = A_{po} \cos(\omega t) \tag{17}$$

Using the Hilbert transform the output becomes:

$$PO_{hilbert} = A_{po} \sin(\omega t) \tag{18}$$

Combining the original terms with the output of the Hilbert transform yields:

$$PO = A_{po}[\cos(\omega t) + i \sin(\omega t)] = A_{po} e^{j(\omega t)} \tag{19}$$

Figure 5:
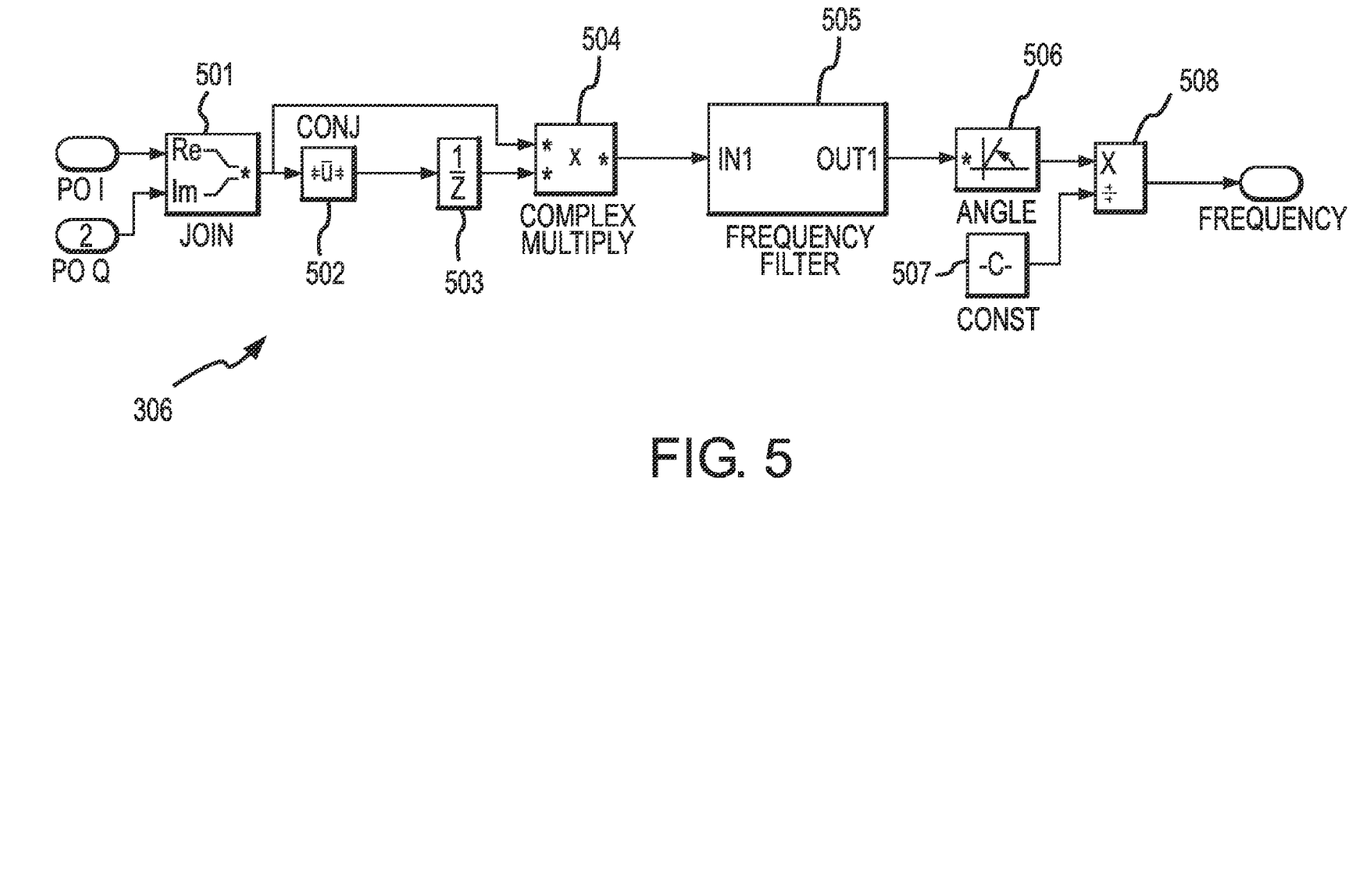
FIG. 5 is a block diagram of the analysis block according to an embodiment of the invention.

FIG. 5 is a block diagram of the analysis block 306A or 306B according to an embodiment of the invention. The analysis block 306A or 306B receives a signal from a single pickoff (PO) signal. The analysis block 306A or 306B in the embodiment shown includes a join block 501, a complex conjugate block 502, a sampling block 503, a complex multiplication block 504, a filter block 505, a phase angle block 506, a constant block 507, and a division block 508.

The join block 501 receives both the in-phase (I) and quadrature (Q) components of a particular vibrational response and passes them on. The conjugate block 502 performs a complex conjugate on the vibrational response and forms a negative of the imaginary signal. The delay block 503 introduces a sampling delay into the analysis block 306A or 306B and therefore selects a digital signal sample that is chronologically older in time. This older digital signal sample is multiplied with the current digital signal in the complex multiplication block 504. The complex multiplication block 504 multiplies the PO signal and the PO conjugate signal, implementing equation (20) below. The filter block 505 implements a digital filter, such as the FIR filter previously discussed. The filter block 505 can comprise a polyphase decimation filter that is used to remove harmonic content from the in-phase (I) and quadrature (Q) components of the sensor signal, as well as to decimate the signal. The filter coefficients can be chosen to provide decimation of the inputted signal, such as decimation by a factor of 10, for example. The phase angle block 506 determines a phase angle from the in-phase (I) and quadrature (Q) components of the PO signal. The phase angle block 506 implements a portion of equation (21) below. The constant block 507 supplies a factor comprising a sample rate $F_s$ divided by two pi, as shown in equation (22). The division block 5908 performs the division operation of equation (22).

The analysis block 306A or 306B implements the following equation:

$$\overline{PO}_{(n-1)} \times PO_{(n)} = A_{po} e^{-j(\omega t-1)} \times A_{po} e^{j(\omega t)} = A_{po}^2 e^{j(\omega t - \omega t_{-1})} \tag{20}$$

The angle between two consecutive samples is therefore:

$$\omega t - \omega t_{-1} = \tan^{-1}\left[\frac{\sin(\omega t - \omega t_{-1})}{\cos(\omega t - \omega t_{-1})}\right] \tag{21}$$

which is the radian frequency of the vibrational response. Converting to Hz:

$$f_{po} = \frac{(\omega t - \omega t_{-1}) \times Fs}{2\pi} \tag{22}$$

where "Fs" is the rate of the Hilbert transform block 304A or 304B. In some embodiments, "Fs" is about 2 kHz.

Figure 6:
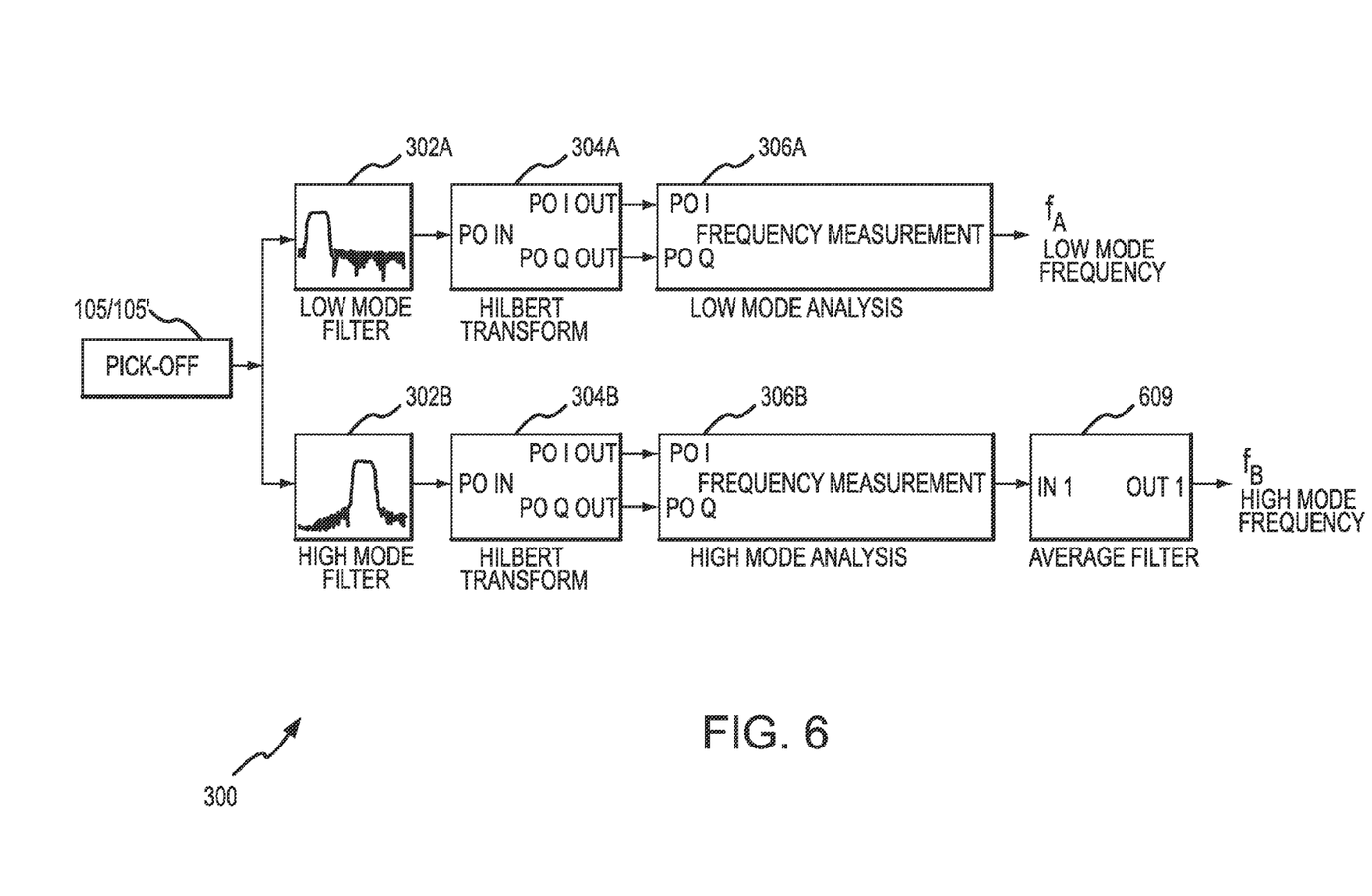
FIG. 6 shows the circuitry for generating a first frequency and at least a second frequency according to an embodiment of the invention.

FIG. 6 shows the circuitry 300 for generating a first frequency and at least a second frequency according to an embodiment of the invention. Components in common with other embodiments share reference numbers. This embodiment differs from the previous embodiment 300 by further including an averaging filter 609.

This embodiment likewise receives a vibrational response from the single pickoff sensor 105/105'. However, the single vibratory flow meter in this embodiment may be vibrated at only a single frequency, wherein noise in the flow meter generates a second vibrational response, as previously discussed. The circuitry 300 therefore takes advantage of noise in the flow system. Since small amounts of flow noise will stimulate sensor modes, a self-induced higher vibrational response mode will be detectable even if no drive signal is provided. This means only one drive signal is required.

This method requires much more filtering since the higher mode signal (which is not being reinforced with a drive) will be at a much lower amplitude. Because the approximate frequency range of this higher mode vibrational response is known, the lower amplitude is not a significant problem. In addition, another concern is that because of the lower amplitude, the density measurement will be much noisier as well. As long as slow response times are acceptable, this problem can be eliminated by averaging many samples after the frequency measurement has taken place. To this end, the averaging filter 609 can average out the at least second frequency in order to improve the frequency determination and reduce noise and errors in the result.

Figure 7:
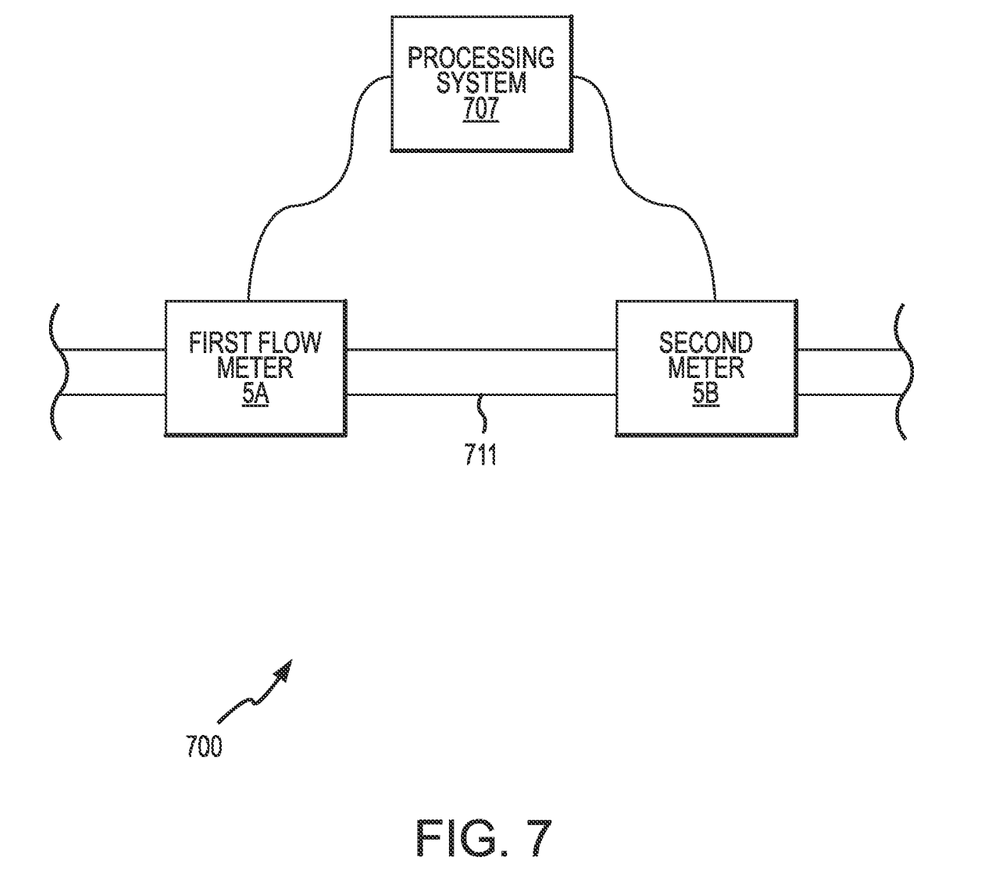
FIG. 7 shows a vibratory flow meter system for measuring flow characteristics of a three phase flow according to an embodiment of the invention.

FIG. 7 shows a vibratory flow meter system 700 for measuring flow characteristics of a three phase flow according to an embodiment of the invention. The vibratory flow meter system 700 includes a first flow meter 5A and at least a second flow meter 5B. The flow meters 5A and 5B are connected in a conduit 711. The flow meters 5A and 5B both measure a three phase flow that is flowing in the conduit 711. The vibratory flow meter system 700 further includes a processing system 707. The processing system 707 is coupled to the first flow meter 5A and the at least a second flow meter 5B. The processing system 707 receives a first vibrational response from the first flow meter 5A and receives at least a second vibrational response from the at least second flow meter 5B. The processing system 707 can determine a first density, at least a second density, and additional flow characteristics, as previously discussed and as discussed below in conjunction with FIG. 8.

Figure 8:
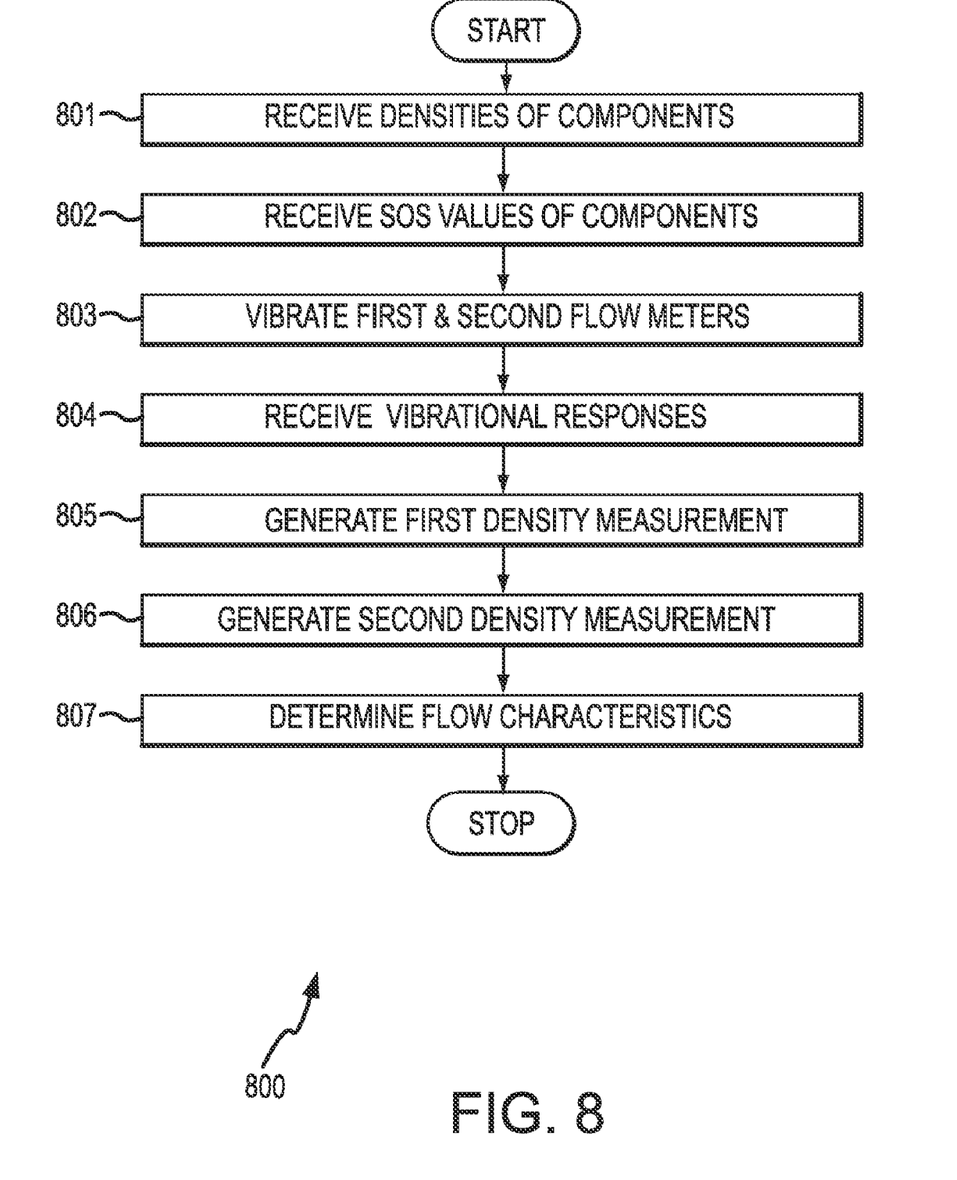
FIG. 8 is a flowchart of a method for measuring flow characteristics of a three phase flow according to an embodiment of the invention.

FIG. 8 is a flowchart 800 of a method for measuring flow characteristics of a three phase flow according to an embodiment of the invention. In step 801, densities are received for each of the three phase components, as previously discussed.

In step 802, speed of sound values are received for each of the three phase components, as previously discussed.

In step 803, a first vibratory flow meter and at least a second vibratory flow meter are vibrated. The first vibratory flow meter is vibrated at a first frequency and generates a first vibrational response. The at least second vibratory flow meter is vibrated at an at least second frequency and generates an at least second vibrational response.

Two or more vibratory flow meters can be employed according to this embodiment of the invention. It should be understood that more than two vibratory flow meters can be included and more than two vibrational responses can be received. Multiple vibrational responses can be employed and may further refine the density and flow characteristics calculations.

It should be understood that the multiple vibratory flow meters must operate on a common three phase flow stream. In addition, the flow stream must be at about the same pressure at each of the multiple vibratory flow meters.

In step 804, the first vibrational response and the at least second vibrational response are received from the first vibratory flow meter and the at least second vibratory flow meter. The at least second vibrational response comprises a different frequency than the first vibrational response, as previously discussed.

In step 805, a first density measurement of the three phase flow is generated, as previously discussed.

In step 806, at least a second density measurement of the three phase flow is generated, as previously discussed.

In step 807, one or more flow characteristics are determined from a difference between the first and second density measurements, as previously discussed.

What is claimed is:

1. A vibratory flow meter (5) for measuring flow characteristics of a three phase flow, the vibratory flow meter (5) comprising a meter assembly (10) including pickoff sensors (105, 105') and meter electronics (20) coupled to the pickoff sensors (105, 105'), with the vibratory flow meter (5) being characterized by:
the meter electronics (20) being configured to receive a vibrational response from the pickoff sensors (105, 105'), generate a first density measurement of the three phase flow using a first frequency component of the vibrational response, generate at least a second density measurement of the three phase flow using at least a second frequency component of the vibrational response, with the at least second frequency component being a different frequency than the first frequency component, and determine one or more flow characteristics from the first density measurement and the at least second density measurement.

2. The vibratory flow meter (5) of claim 1, with the meter electronics (20) being further configured to receive predetermined component densities for each of the three components of the three phase flow.

3. The vibratory flow meter (5) of claim 1, with the meter electronics (20) being further configured to receive predetermined speed of sound values for each of the three components of the three phase flow.

4. The vibratory flow meter (5) of claim 1, with determining the one or more flow characteristics further comprising determining phase fractions for each of the three components of the three phase flow.

5. The vibratory flow meter (5) of claim 1, with determining the one or more flow characteristics further comprising determining a gas void fraction (GVF) of the three phase flow.

6. The vibratory flow meter (5) of claim 1, with determining the one or more flow characteristics further comprising determining a water cut of the three phase flow.

7. The vibratory flow meter (5) of claim 1, with the at least second frequency component being substantially superimposed on the first frequency component.

8. The vibratory flow meter (5) of claim 1, with the first frequency component and the at least second frequency component occurring at substantially alternate times in the vibrational response.

9. The vibratory flow meter (5) of claim 1, with the meter electronics (20) being further configured to vibrate the meter assembly (10) at a first frequency and vibrate the meter assembly (10) at an at least second frequency, with the at least second frequency being a different frequency than the first frequency, receive the vibrational response from the pickoff sensors (105,105'), and separate the vibrational response into the first frequency component and the at least second frequency component.

10. The vibratory flow meter (5) of claim 1, with the meter electronics (20) being further configured to vibrate the meter assembly (10) at a first frequency, receive the vibrational response from the pickoff sensors (105, 105'), and separate the vibrational response into the first frequency component and the at least second frequency component, wherein the first frequency component and the at least second frequency component are generated by the vibration at the first frequency.

11. The vibratory flow meter (5) of claim 1, with receiving the vibrational response further comprising separating the vibrational response into the first frequency component and the at least second frequency component.

12. The vibratory flow meter (5) of claim 1, with receiving the vibrational response further comprising filtering the vibrational response into the first frequency component and the at least second frequency component.

13. A vibratory flow meter system (700) for measuring flow characteristics of a three phase flow, the vibratory flow meter system (700) being characterized by:
a first vibratory flow meter (5A);
at least a second vibratory flow meter (5B); and
a processing system (707) coupled to the first vibratory flow meter (5A) and to the at least second vibratory flow meter (5B), with the processing system (707) being configured to receive a first vibrational response from the first vibratory flow meter (5A), receive at least a second vibrational response from the at least second vibratory flow meter (5B), with the at least second vibrational response being a different frequency than the first vibrational response, generate a first density measurement of the three phase flow from the first vibrational response of the first vibratory flow meter (5A), generate an at least second density measurement of the three phase flow from the at least second vibrational frequency response of the at least second vibratory flow meter (5B), and determine one or more flow characteristics from the first density measurement and the at least second density measurement.

14. The vibratory flow meter system (700) of claim 13, with the processing system (707) being further configured to receive predetermined component densities for each of the three components of the three phase flow.

15. The vibratory flow meter system (700) of claim 13, with the processing system (707) being further configured to receive predetermined speed of sound values for each of the three components of the three phase flow.

16. The vibratory flow meter system (700) of claim 1, with determining the one or more flow characteristics further comprising determining phase fractions for each of the three components of the three phase flow.

17. The vibratory flow meter system (700) of claim 13, with determining the one or more flow characteristics further comprising determining a gas void fraction (GVF) of the three phase flow.

18. The vibratory flow meter system (700) of claim 13, with determining the one or more flow characteristics further comprising determining a water cut of the three phase flow.

19. The vibratory flow meter system (700) of claim 13, wherein the first vibratory flow meter (5A) is vibrated at a first frequency to generate the first vibrational response and the at least a second vibratory flow meter (5B) is vibrated at an at least second frequency to generate the at least second vibrational response.

20. A method for measuring flow characteristics of a three phase flow, the method comprising:

receiving a vibrational response from a vibratory flow meter;
generating a first density measurement of the three phase flow using a first frequency component of the vibrational response;
generating at least a second density measurement of the three phase flow using at least a second frequency component of the vibrational response, with the at least second frequency component being a different frequency than the first frequency component; and
determining one or more flow characteristics from the first density measurement and the at least second density measurement.

21. The method of claim 20, further comprising the preliminary step of receiving predetermined component densities for each of the three components of the three phase flow.

22. The method of claim 20, further comprising the preliminary step of receiving predetermined speed of sound values for each of the three components of the three phase flow.

23. The method of claim 20, with determining the one or more flow characteristics further comprising determining phase fractions for each of the three components of the three phase flow.

24. The method of claim 20, with determining the one or more flow characteristics further comprising determining a gas void fraction (GVF) of the three phase flow.

25. The method of claim 20, with determining the one or more flow characteristics further comprising determining a water cut of the three phase flow.

26. The method of claim 20, with the at least second frequency component being substantially superimposed on the first frequency component.

27. The method of claim 20, with the first frequency component and the at least second frequency component occurring at substantially alternate times in the vibrational response.

28. The method of claim 20, with receiving the vibrational response further comprising:
vibrating a meter assembly of the vibratory flow meter at a first frequency and further vibrating the meter assembly at an at least second frequency, with the at least second frequency being a different frequency than the first frequency;
receiving the vibrational response from pickoff sensors of the meter assembly; and
separating the vibrational response into the first frequency component and the at least second frequency component.

29. The method of claim 20, with receiving the vibrational response further comprising:
vibrating a meter assembly of the vibratory flow meter at a first frequency;
receiving the vibrational response from pickoff sensors of the meter assembly; and
separating the vibrational response into the first frequency component and the at least second frequency component, wherein the first frequency component and the at least second frequency component are generated by the vibration at the first frequency.

30. The method of claim 20, with receiving the vibrational response further comprising separating the vibrational response into the first frequency component and the at least second frequency component.

31. The method of claim 20, with receiving the vibrational response further comprising filtering the vibrational response into the first frequency component and the at least second frequency component.

32. A method for measuring flow characteristics of a three phase flow, the method comprising:
- receiving a first vibrational response and an at least second vibrational response;
- generating a first density measurement of the three phase flow from the first vibrational response;
- generating an at least second density measurement of the three phase flow from the at least second vibrational frequency response, with the at least second vibrational frequency response being a different frequency than the first vibrational frequency response; and
- determining one or more flow characteristics from the first density measurement and the at least second density measurement.

33. The method of claim 32, further comprising the preliminary step of receiving predetermined component densities for each of the three components of the three phase flow.

34. The method of claim 32, further comprising the preliminary step of receiving predetermined speed of sound values for each of the three components of the three phase flow.

35. The method of claim 32, with determining the one or more flow characteristics further comprising determining phase fractions for each of the three components of the three phase flow.

36. The method of claim 32, with determining the one or more flow characteristics further comprising determining a gas void fraction (GVF) of the three phase flow.

37. The method of claim 32, with determining the one or more flow characteristics further comprising determining a water cut of the three phase flow.

38. The method of claim 32, with receiving the vibrational response further comprising:
- receiving the first vibrational response from a first vibratory flow meter; and
- receiving the at least second vibrational response from a second vibratory flow meter, with the at least second vibrational response being a different frequency than the first vibrational response.

39. The method of claim 32, with receiving the vibrational response further comprising:
- vibrating a first vibratory flow meter at a first frequency to generate the first vibrational response; and
- vibrating at least a second vibratory flow meter at an at least second frequency to generate the at least second vibrational response, with the at least second vibrational response being a different frequency than the first vibrational response.

* * * * *